(12) United States Patent
Phillips et al.

(10) Patent No.: US 7,502,856 B1
(45) Date of Patent: Mar. 10, 2009

(54) REDIRECTING FILE ACCESS THROUGH A HTTP WEB SERVER

(75) Inventors: Anthony H. Phillips, Southampton (GB); Timothy E. Preece, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/058,808

(22) Filed: Mar. 31, 2008

(51) Int. Cl.
*G06F 15/173* (2006.01)
*G06F 12/00* (2006.01)

(52) U.S. Cl. .................. 709/225; 713/201
(58) Field of Classification Search .............. 709/203, 709/225, 232, 250; 713/201
See application file for complete search history.

(56) References Cited

U.S. PATENT DOCUMENTS

| 6,278,449 | B1 | 8/2001 | Sugiarto et al. | |
| 6,856,989 | B1 | 2/2005 | Zhou et al. | |
| 2005/0229106 | A1* | 10/2005 | Labarge et al. | 715/745 |
| 2006/0155993 | A1* | 7/2006 | Busboon | 713/169 |
| 2006/0294152 | A1* | 12/2006 | Kawabe et al. | 707/200 |
| 2007/0162419 | A1 | 7/2007 | Ahn et al. | |
| 2007/0294756 | A1* | 12/2007 | Fetik | 726/11 |
| 2008/0232582 | A1* | 9/2008 | Chevallier-Mames et al. | 380/44 |

FOREIGN PATENT DOCUMENTS

DE 102005032284 1/2007

* cited by examiner

*Primary Examiner*—Zarni Maung
(74) *Attorney, Agent, or Firm*—Oppenheimer Wolff & Donnelly LLP

(57) ABSTRACT

The present invention provides for a method redirecting file access through a web server through the use of a symbolic link file. This symbolic link file is modified to include connection and authentication information of a file stored on a remote system but is accessible through a web server. When the modified symbolic link file is accessed on the local computer, the local computer recognizes that the symbolic link requires an internet connection to the linked file. The local computer establishes an internet connection to the web server using the connection and authentication connection information in the modified link file. The file is accessed and downloaded from the web server. The local computer is able to seamlessly access the modified symbolic link file as if it was a unmodified symbolic link file.

1 Claim, 2 Drawing Sheets

REDIRECTING FILE ACCESS THROUGH A HTTP WEB SERVER

FIELD OF THE INVENTION

The present invention generally relates to a file system operating on a computer system. The present invention specifically relates to a method of redirecting file access to a computer system though a HTTP web server.

BACKGROUND OF THE INVENTION

Symbolic links (commonly referred to as a symlink or "soft link") are a special type of file that serves as a reference to another file or directory. Unix-based operating systems, in particular, feature symbolic links. Unlike a hard link, which points directly to data and represents another name for the same file, a symbolic link contains a path that identifies the target of the symbolic link. Thus, when a user removes a symbolic link, the file to which it pointed remains unaffected. A large advantage of symbolic links is that they operate transparently, meaning that programs that read or write to files named by a symbolic link behave as if operating directly on the target file.

In the current art, there are many cases where copying large files between computer systems is simply unfeasible. For example, a core dump from an operating system may result in data consuming gigabytes of space. Symbolic links are useful for accessing these large files, particularly because symbolic links may refer to files on other mounted file systems, allowing access to a large file on another file system without first requiring the transfer of the file. However, existing symbolic links do not allow access to files existing on a remote network.

For many organizations, the only way into their computer network from a remote location is through HTTP and their web servers. Such organizations would not entertain the idea of giving a user from another organization a trusted VPN connection into their internal network for the purpose of accessing a particular file. Furthermore, it is not feasible for the web server to use any kind of file network protocol (such as SAMBA), since there are too many security vulnerabilities and intractable problems such as remote authentication between untrusted domains.

What is needed is a way to allow remote access to files through a web server while utilizing the advantages of a symbolic link.

BRIEF SUMMARY OF THE INVENTION

The present invention provides a new and unique method for redirecting file access though a web server. This file access is accomplished by the use of a symbolic link, with the symbolic link being modified to enable an internet connection to the desired file via a web server.

In one embodiment of the invention, the method operates by creating a symbolic link to a file existing on a remote workstation file system or file store. This file stored on the remote workstation may not be easily accessed via an external system due to its size or an inability to be accessed via an external network connection. The file on this file system or file store, however, is accessible by a web server, and the web server is accessible over the internet by computers in external networks.

The symbolic link is modified to include connection information to the file through the web server such as the web server IP address or DNS name. This connection information may be accompanied by authentication information, such as a username and password or other security authenticators. The modified symbolic link is then placed on an external file system ("local system") which is remote to the workstation file system or store, with the local system having internet access to the web server.

When the symbolic link is accessed on the local system, the connection and authentication information to contained within the symbolic link is processed by the local system to create a connection to the web server. Once the connection has been opened and authenticated, the file system driver on the local system redirects all I/O requests through HTTP to the web server. For secure access to the file the file system driver may optionally send requests using HTTPS.

In a further embodiment of the present invention, the local system contains a driver to distinguish between modified symbolic links and symbolic links in use for local files on the file system. This driver allows both symbolic links and modified symbolic links to be used on a file system, allowing applications to utilize unmodified symbolic links on the file system without interruption. In a further embodiment, the modified link may contain parameters within the request to the web server to indicate a section of the file required by an application.

DETAILED DESCRIPTION OF THE INVENTION

One aspect of the present invention introduces a new kind of symbolic link that can reroute file access requests through a web server. This allows the data to remain on the file system where it was generated, while facilitating the benefits of a symbolic link to allow a remote user to access the data as if it exists on the local file system. Further, through the use of a specialized file system driver according to a further aspect of the present invention, applications and existing symbolic links within the operating system continue to work as before without modification.

In one embodiment of the present invention, a symbolic link is modified to contain connection information to the web server which has access to the desired data. This connection information would typically include a URL, authentication information such as user name and password. This connection information placed within the symbolic link file gives the file system enough information to establish a remote connection, while allowing the symbolic link appear as a regular symbolic link file in the file system.

The present invention utilizes symbolic links, which are well known in UNIX operating systems as a file reference to other files, similar to the use of "shortcuts" in Windows. In the present invention, the symbolic link refers to a file that is stored at a URI location (such as can be defined by a URL). In operation, HTTP or an equivalent communication protocol is used to access the file data using the symbolic link.

Figure 1:
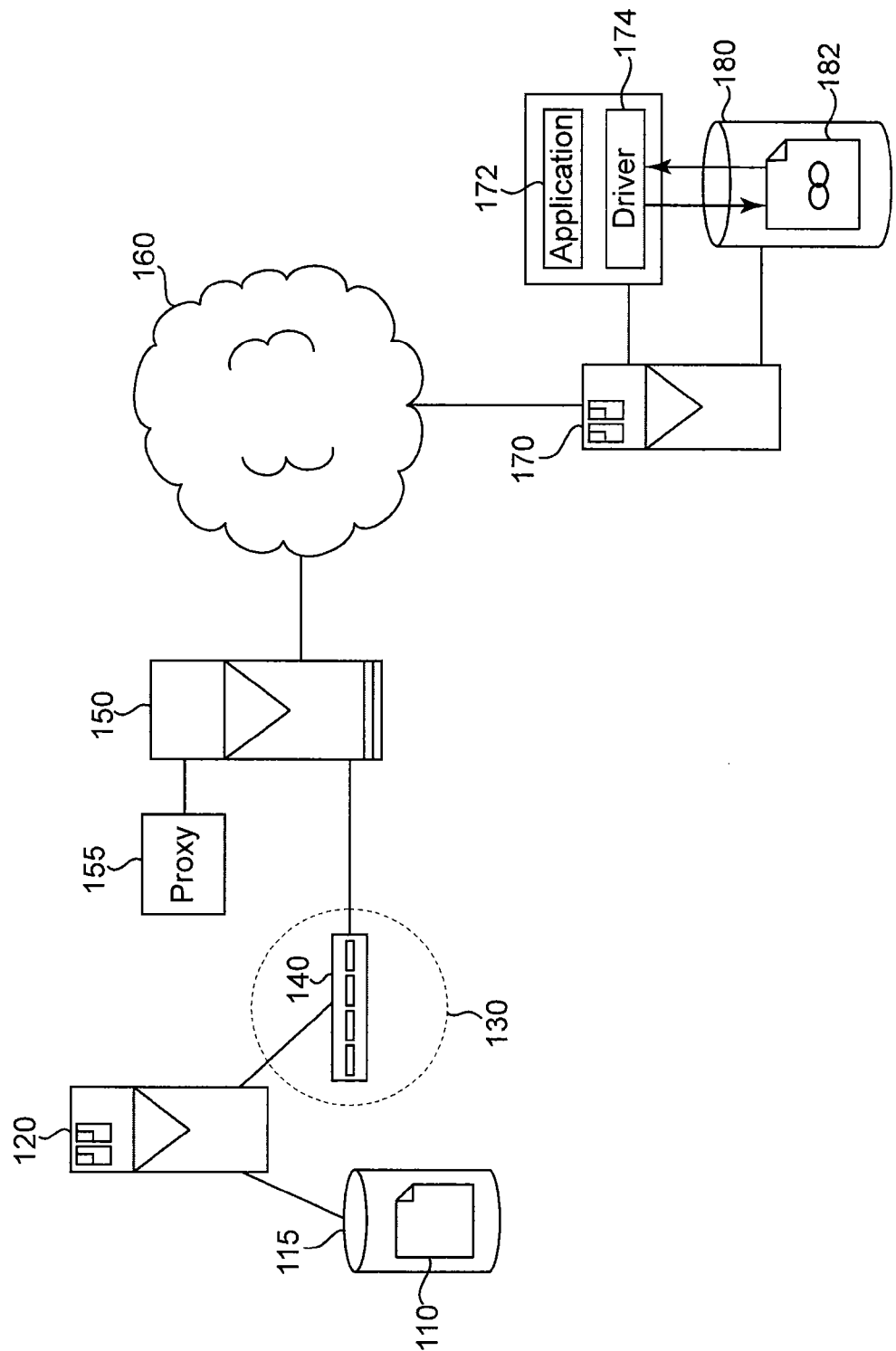
FIG. 1 illustrates an example implementation of an operating environment of the present invention.

FIG. 1 depicts an example implementation environment of the present invention. As depicted, file intended to be accessed 110 (the "target file") exists on a volume 115 of remote workstation 120. The remote workstation is connected over a network 130 via a network switch or router 140 to the web server 140. A local computer 170 is depicted as being connected over the Internet 160 to the web server 150.

The remote workstation 120 has no special software running on it or special configuration other than allowing the web server 150 access to the desired file 110. However, in most deployments, it is unusual to allow a web server direct access to files of an internal workstation. In this case, the target file may need to be copied or moved to a location that is accessible to the web server.

The web server 150 responds to HTTP requests for the file or sections of the file coming from the local computer connected over the internet 160. This is accomplished through the use of a file proxy component 155 operating on the web server. The file proxy 155 on the web server 150 passes on I/O requests by opening and accessing the actual file on the remote workstation 120. Parameters may be passed in the HTTP request processed by the file proxy 150 to indicate the section of the file required by the requesting application.

On the local computer 170, an application 172 accesses the modified symbolic link 182 stored on a local disk volume 180, and is able to initiate access to the underlying file 110 as if it was stored on the local file system. The modified symbolic link 182 is like a regular symbolic link file in existing file systems, but is recognized as a modified symbolic link by a driver 174 operating on the local system 170. As sections of the file are accessed, the driver 174 redirects the I/O API calls through to HTTP (GET) requests on the web server 150.

Figure 2:
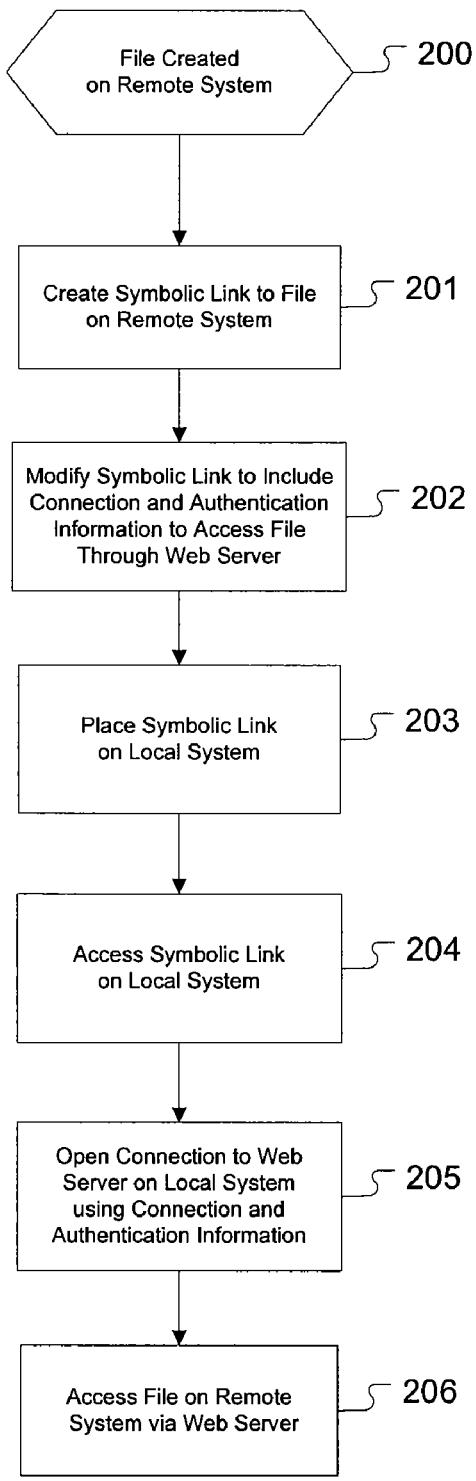
FIG. 2 illustrates a flowchart demonstrating an example operation of one embodiment of the present invention.

FIG. 2 depicts a workflow utilized for configuring and initializing remote file access in accordance with one embodiment of the invention. The following workflow occurs after a file exists or is created on the remote system as in step 200.

1. Step 201: The first processing step occurs on the remote workstation where the target file exists. In an example where access is intended to be provided to a large core dump file, this would be the machine where the Virtual Machine or Operating System core dumped. On this remote machine, the user creates a modified symbolic link to the desired file. Unlike a regular symbolic link, this new kind of modified symbolic link is also a regular file that can be copied onto anther system.

2. Step 202: The user takes steps to add connection information of the web server to the modified symbolic link file. In one embodiment, this may be performed by uploading the symbolic link file to the web server that is running a specialized software component, referred to as the "Web Server File Proxy". In one embodiment of the present invention, the Web Server File Proxy operates to add the web server's DNS name to the symbolic link file, a generated URL unique for this file, and authentication information (which could be a time limited user name and password). In other embodiments, this connection information may be manually added to the modified symbolic link file by a system administrator, or may be added by a standalone program.

3. Step 203: The now completed modified symbolic link file is provided to the user and is placed on the local system. This local system is remote to the remote workstation, but has an internet connection to a web server connected to the remote workstation.

4. Step 204: The modified symbolic link file now exists on the local system, and the modified symbolic link file is accessed using an application. In one embodiment, a specialized file system driver operates on the local system to recognize a modified symbolic link file when opened and accordingly establish a connection to the web server.

5. Step 205: File access is then achieved by opening the connection to the web server using the connection and authentication information contained within the modified symbolic link file. This authentication information is then passed to the web server and processed. Once the connection has been opened and authenticated, the file system driver on the local system redirects all I/O requests through HTTP to the Web Server File Proxy operating on the web server.

6. Step 206: The Web Server File Proxy operating on the web server passes on I/O requests by accessing and opening the actual file on the remote workstation. In principle, the forwarding of I/O requests could be chained together through several servers if, for example, the traffic needs to be routed through a DMZ-style deployment. In this case, two File Proxies would communicate to pass on I/O requests. One File Proxy would be in the DMZ and have an external facing IP address, while the second would be inside the protected zone.

As described above, the Web Proxy File System Driver operating on the local system must detect which files are modified symbolic link files and which are not. This could be achieved by embedding the metadata (DNS name, URL, authentication information etc) in a special stream if the file system supports this feature (for example, NTFS supports streams). Alternatively, the symbolic link file could be a regular text document and rely on a particular file extension for identification.

Because file system requests are routed through HTTP, standard web technology and security protocols may be utilized. For example, the file system proxy driver can open a secure (HTTPS) connection to the server that is further authenticated using client and or server certificates. Secure connections may indeed be important since large files such as crash dumps can contain sensitive information including passwords and user names. These proxies are not required to use HTTP/HTTPS as their communication protocol, as they are optionally implemented with any equivalent communication protocol.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for redirecting file access through a web server, comprising:

creating a symbolic link to a file existing on a file system, wherein the file is accessible by an internet-connected web server;

modifying the symbolic link by including connection information and authentication information in the symbolic link to remotely access the file on the file system with a connection through the web server;

placing the symbolic link on a system remote to the file system;

accessing the symbolic link on the system remote to the file system, wherein the system remote to the file system utilizes a component which recognizes that the symbolic link contains a reference to the file accessible by the web server via an internet connection to the web server;

opening on the system remote to the file system a connection to the web server and authenticating the connection to the web server, the connection utilizing the connection information and authentication information contained within the symbolic link; and accessing the file through the web server via the authenticated connection.

* * * * *